United States Patent [19]

Booth

[11] 4,118,042
[45] Oct. 3, 1978

[54] AIR BEARING VACUUM SEAL ASSEMBLY

[75] Inventor: Rex Booth, Livermore, Calif.

[73] Assignee: The United States of America as represented by the United States Department of Energy, Washington, D.C.

[21] Appl. No.: 837,252

[22] Filed: Sep. 27, 1977

[51] Int. Cl.² .......................... F16J 15/40; G21G 4/02
[52] U.S. Cl. ........................................ 277/226; 277/3; 313/61 R; 313/148; 313/149; 308/36.3; 250/501
[58] Field of Search ................ 313/60, 148, 149, 359, 313/363, 61 R; 308/DIG. 1, 9, 36.3; 250/499, 501, 502; 277/3, 15, 12, 27, 135, 81 R, 215, 226, DIG. 1, DIG. 5

[56] References Cited

U.S. PATENT DOCUMENTS

| 3,005,767 | 10/1961 | Boyer et al. ............... 313/61 R X |
| 3,287,592 | 11/1966 | Hirschfield et al. ............... 313/60 X |
| 3,336,491 | 8/1967 | Mercer et al. ............... 313/148 |
| 3,452,839 | 7/1969 | Swearingen ............... 308/36.3 X |
| 3,499,653 | 3/1970 | Gargner ............... 277/27 |
| 3,733,490 | 5/1973 | Roche ............... 250/501 |

FOREIGN PATENT DOCUMENTS 2,308,508  9/1974  Fed. Rep. of Germany ............ 313/60

Primary Examiner—Robert S. Ward, Jr.
Attorney, Agent, or Firm—Dean E. Carlson; Roger S. Gaither; L. E. Carnahan

[57] ABSTRACT

An air bearing vacuum seal assembly capable of rotating at the speed of several thousand revolutions per minute using an air cushion to prevent the rotating and stationary parts from touching, and a two stage differential pumping arrangement to maintain the pressure gradient between the air cushion and the vacuum so that the leak rate into the vacuum is, for example, less than $1 \times 10^{-4}$ Pa m³/s. The air bearing vacuum seal has particular application for mounting rotating targets to an evacuated accelerator beam tube for bombardment of the targets with high-power charged particle beams in vacuum.

11 Claims, 4 Drawing Figures

AIR BEARING VACUUM SEAL ASSEMBLY

BACKGROUND OF THE INVENTION

The invention described herein was made in the course of, of under, Contract No. W-7405-ENG-48, with the United States Energy Research and Development Administration.

This invention relates to seals, particularly to rotating vacuum seals, and more particlarly to a high-speed rotating air bearing vacuum seal assembly.

For a number of years high-speed rotating vacuum seals having, for example, an inner diameter of 6.3 cm and rotating at 1100 rpm, have been used to permit the bombardment of thin targets with highpower charged-particle beams in vacuum. The target is rotated in the beam, and the backside of the target which is at atmospheric pressure is water cooled. It order to distribute the power over as large an area as possible, the diameter of the target is made larger than the inner diameter of the rotating seal. The previously known, rotating seal has been used, for example, in the bombardment of a 21 cm diameter tritium-loaded titanium target with more than 8 kW of beam power concentrated on a spot on the target about 1 cm in diameter.

The need for increasing the beam power has established a necessity of a larger diameter seal which can rotate at a higher speed and which at the same time has a low leak rate. In the previously known rotating seals a loaded teflon ring sliding on mild steel was utilized, which is not satisfactory at the higher speed.

Although air bearings have been used in many applications, including bearings which separated two different gases, the requirement of maintaining a vacuum on the inside of the bearing introduces complications which cannot be overcome by prior known air bearings or rotating vacuum seals. Thus, a need exists for a seal capable of handling the diameter, speed, and other conditions imposed by advancing requirements.

SUMMARY OF THE INVENTION

The present invention provides a solution to the above problems of the prior known rotating seals and fills the need for higher speed, larger diameter vacuum seals, by the combination of an air bearing and pump-activated vacuum seals, which is particularly useful for mounting rotating targets to an evacuated accelerator beam tube. Basically, as illustrated, the rotating vacuum seal assembly comprises a structure defining generally conical bearing surfaces, a flat "thrust" bearing surface, and an air supply for injecting air under pressure between the bearing surfaces, with leakage of high pressure air into the beam tube prevented by means of a series of annular grooves between the pressurized bearing surfaces and the associated evacuated beam tube region which are connected to vacuum pumps. The air serves as both lubricant and coolant. These two stages of differential pumping maintain the pressure gradient between the air bearing area and the vacuum of the beam tube so that the leak rate into the vacuum tube is less than $1 \times 10^{-4}$ Pa m$^3$/s, while rotating at 5000 revolutions per minute. The clear inner diameter of the seal is 7.5 cm and can accommodate a 50 cm diameter target. Thus, with this air bearing vacuum seal assembly the seal diameter, speed of rotation of targets and beam power of charged-particles can be substantially increased.

Therefore, it is an object of this invention to provide a high-speed rotating vacuum seal assembly.

A further object of the invention is to provide a high-speed rotating vacuum seal assembly which utilizes the combination of an air bearing and vacuum pumping.

Another object of the invention is to provide an air bearing vacuum seal assembly for use in rotating targets for bombardment with high-power charged-particle beams in vacuum.

Another object of the invention is to provide an air bearing vacuum seal assembly which is capable of rotating at 5000 revolutions per minute and includes a differential pumping arrangement which maintains a pressure gradient between the air cushion and the vacuum so that the leak rate into the vacuum is less than $1 \times 10^{-4}$ Pa m$^3$/s.

Other objects of the invention will become readily apparent from the following description and accompanying drawings.

DESCRIPTION OF THE INVENTION

The invention is an air bearing vacuum seal assembly, particularly applicable for mounting rotating targets to an evacuated accelerator beam tube to permit the bombardment of the targets with high-power charged particle beams in vacuum. An air cushion prevents the rotation and stationary parts from touching, the air serving as both lubricant and coolant. Two stages of differential pumping maintain the pressure gradient between the air cushion and the tube vacuum so that the leak rate into the vacuum is less than $1 \times 10^{-4}$ Pa m$^3$/s. The vacuum seal assembly can be rotated at 5000 revolutions per minute, while providing a clear inner diameter of 7.5 cm, for example. Thus, the rotating vacuum seal of this invention is capable of high speed rotation while having a large inner diameter and a low leak rate, for use with, for example, a 50 cm diameter target.

Figure 1:
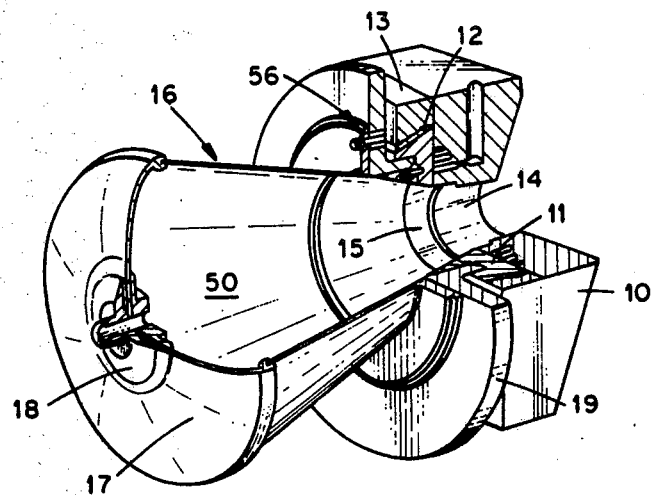
FIG. 1 is a view partially in cross-section, of an embodiment of the rotating vacuum seal assembly of the invention attached to a drive turbine and target assembly.
Figure 2:
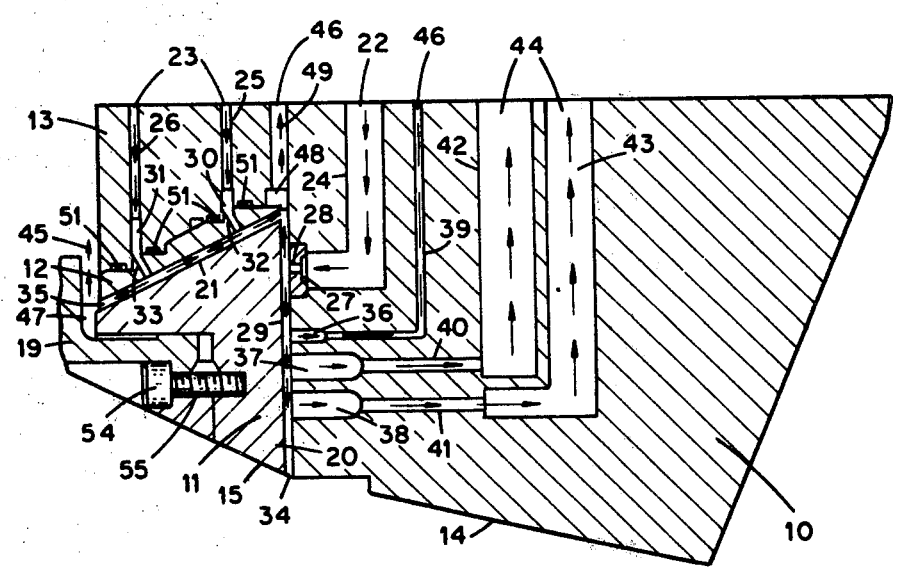
FIG. 2 is a sectional view illustrated the air and vacuum flow lines of the seal assembly of the invention.
Figure 3:
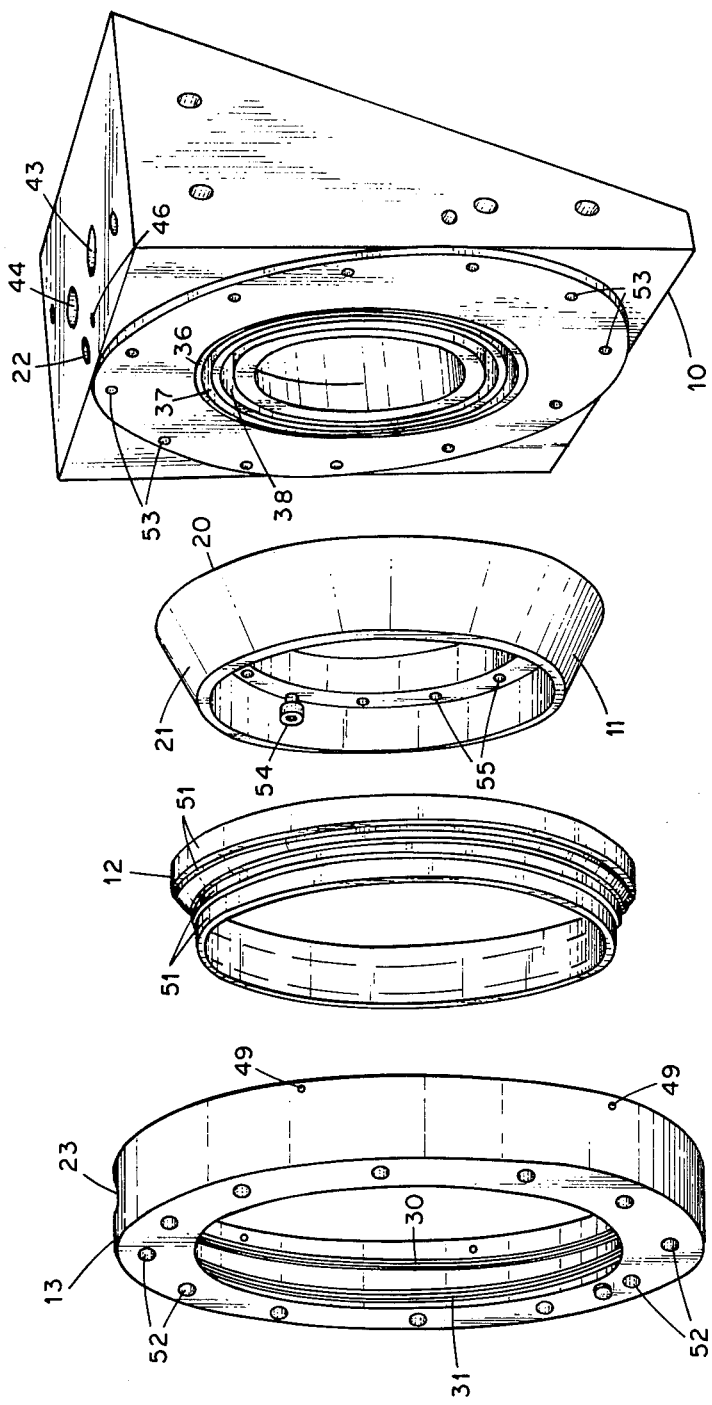
FIG. 3 is an exploded view of an embodiment of the air bearing vacuum seal assembly of the FIG. 1 embodiment of the invention.

Referring now to the drawings, the rotating air bearing vacuum seal assembly is basically composed of four principal units or components, as illustrated in FIGS. 1, 2, and 3, these being a stator 10, a rotor 11, a cone bearing ring 12, and a cone bearing ring support 13. The stator 10 has a central aperture or opening 14, of 7.5 cm diameter, for example, to which is adapted to be attached, for example, an evacuated accelerator beam tube, not shown. Rotor 11 has a central aperture 15 and has secured thereto a target mounting assembly 16 having, for example, a 21–50 cm titanium-tritide target 17 mounted thereon (see FIG. 1). Target 17 is provided at the central portion 18 thereof with means for connecting cooling and diagnostic equipment thereto. Rotor 11 is also secured as shown in FIG. 2 to a drive turbine 19 for rotating same at high speed. Inasmuch as the target mounting assembly 16, the target 17, and the drive turbine 19 do not constitute part of this invention, further description thereof is deemed unnecessary, these components being illustrated and described in report UCRL-78792 entitled "High Speed Rotating Vacuum Seal" by R. Booth et al, dated Oct. 1976. The cone bearing ring 12 and the cone bearing ring support 13 are stationary rings secured by means not shown to stator 10 and serve to hold the rotor 11 in position.

Rotor 11 has two air bearing surfaces — a flat surface 20 facing stator 10 and a conical surface 21 facing cone bearing ring 12 (see FIG. 2). Conical surface 21 is open to the atmosphere, while flat surface 20 maintains a pressure gradient between the atmosphere and vacuum through differential pumping on the vacuum side.

Air from air supplies 22 and 23 is injected between the bearing surfaces via inlet passageway 24 in stator 10 and inlet passageways 25 and 26 in cone bearing ring support 13 at a pressure, for example, of about seven atmospheres. The air inlet passageway 24 connects air supply 22 with an annular air passage 27, and a plurality of small holes 28 extend from a flat face surface 29 of stator 10 to air passage 27; there being, for example, 72 holes 28 having a 0.25 mm diameter. The air inlet passageways 25 and 26 connect air supply 23 with annular grooves or air passages 30 and 31, respectively, located adjacent cone bearing ring 12, and a plurality of small holes 32 and 33 extend through cone bearing ring 12 and connect with annular grooves 30 and 31, respectively; there being, for example, 48 holes 32 and 33 having a 0.4 mm diameter. A gap 34, having a width of less than 10 $\mu$m, for example, exists between the flat face surface 29 of stator 10 and the flat surface 20 of rotor 11, while a gap 35 of a similar width exists between cone bearing ring 12 and conical surface 21 of rotor 11.

The flat face surface 29 of stator 10 is provided with three annular grooves 36, 37, and 38 which provide the differential pumping system. The groove 36 is connected via a pair of passageways 39 to the atmosphere, while grooves 37 and 38 are connected via passages 40 and 41 to vacuum ports 42 and 43, respectively, connected to a vacuum pump system 44. For example, grooves 37 and 38 are 5 mm wide and 15 mm deep, and are separated by 1.5 mm, while passages 40 and 41 are 20 by 5 mm slots and 2 cm long. There is a 1 cm flat surface distance, for example, between inner groove 38 and the inner opening or aperture 14 of stator 10. For example, groove 36 is separated from groove 37 by 1.5 mm and has a width of 2 mm and a depth of 8 mm.

Figure 4:
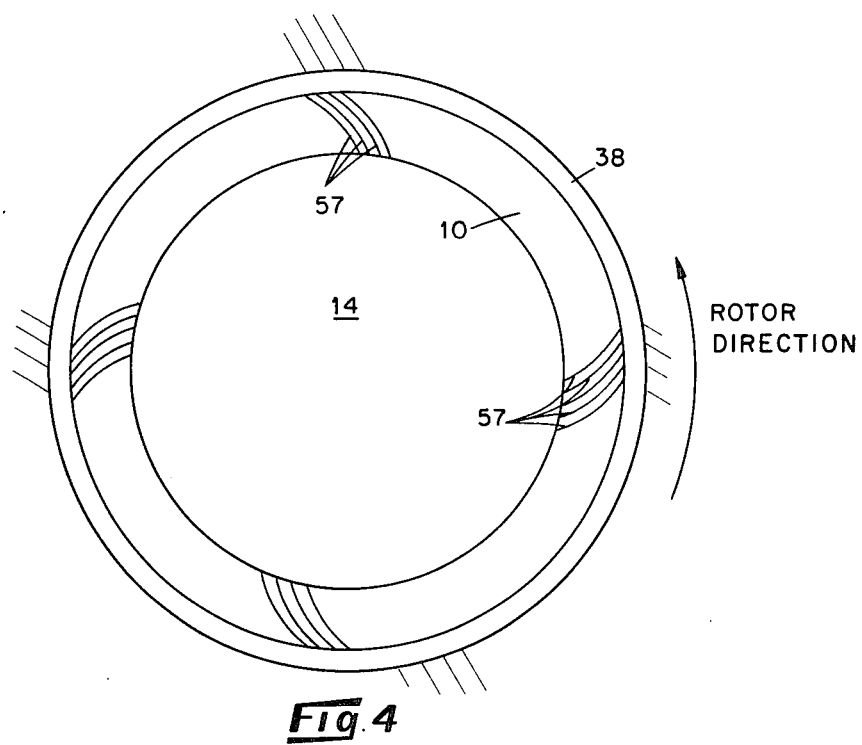
FIG. 4 is a view of a section of the stator showing drag pump grooving.

Operation of the air bearing vacuum seal assembly commences with the start-up of air supplies 22 and 23 and vacuum system 44. Air under pressure is injected into the above described air inlet passages, passes through gaps 34 and 35, and discharges via air exhaust 45 and/or exhaust 46 as indicated by the flow arrows in FIG. 2. Exhaust 45 is formed by a gap or space 47 between drive turbine 19 and cone bearing ring 12, the air being supplied from air supply 23. Air from supply 23 also discharges from gap 35 through exhaust 46 via an annular groove 48 and passageway 49 in cone bearing ring support 13. Air from gap 34 discharges either via groove 48 and passageway 49 or groove 36 and passageway 39 through the exhaust generally indicated at 46. The vacuum system 44 is constructed so as to provide independent evacuation pressures in vacuum ports 42 and 43 thereby creating first and second stages which result in a differential pumping effect across the flat face surface 29 of stator 10 and thereby maintain a pressure gradient between the air cushion in gap 34 and the vacuum area 50 in stator, and rotor central apertures 14 and 15, so that the leak rate of the air flow in gap 34 into the vacuum of the central apertures is less than $1 \times 10^{-4}$ Pa m$^3$/s. For example, the vacuum created in ports 42 and 43 would be 2000 torr and 200 torr, respectively, for the above described rotor and stator parameters. Any air leaking toward the high vacuum area 50 from the air exhaust groove 36 is intercepted by the grooves 37 and 38 and by the drag pumping ("sealing") effect created by the rotation of the rotor 11 and is forced outwardly enabling evacuation thereof. The drag pumping is created by a multiplicity of curved grooves (about 400 in this embodiment) 57, as seen in FIG. 4, between differential pumping groove 38 and central opening 14 in stator 10. These grooves are designed to reduce the leakage past this area when the rotor is rotated in the "designed" direction, illustrated by arrow and legend in FIG. 4. By the use of these drag pumping grooves the leak rate, at 5000 rpm, can be lowered by a factor of 10. The grooves 57 are "V" shaped, 0.12 mm deep and spaced 0.3 mm apart from center-to-center in this embodiment, and have a curvature of 30°. In operation, the rotor 11 surface rotation drags the leaking gas along the drag pumping grooves 57 to stator pumping groove 38, where it is pumped out by the vacuum pump system 44.

Rotor 11 is made of strong, rigid and hard material, such as hardened steel. In order to minimize damage in the event the rotor 11 and stator 10 touch, the stator is made of free machining brass. As a further protection of the surfaces, the rotor is coated with tungsten disulfide, a dry lubricant.

Cone bearing ring 12, which is also made of free machining brass restrains rotor 11 in the radial direction and axially loads rotor 11 against the stator 10 and prevents the rotor from falling off in the event of a vacuum failure. In addition, the cone bearing ring 12 compensates for variations in rotor dimensions caused by changes in temperature and stress. This is accomlished by allowing axial motion of the cone bearing ring through variations in compression of four O-rings 51 which separate the cone bearing ring 12 from the cone bearing ring support 13 (see FIGS. 2 and 3), the O-rings 51 being located adjacent annular grooves 30 and 31. Cone bearing ring support 13 is constructed of free machining brass and is provided with a plurality of apertures 52 through which bolts, not shown, extend and are threadedly secured in threaded holes 53 in stator 10, thus securing rotor 11 and cone bearing ring 13 to stator 10. Drive turbine 19 is secured to rotor 11 via bolts 54 which are threadedly secured in threaded holes 55 in rotor 11 (see FIG. 2); while target assembly 16 is secured to drive turbine 19 by bolts as indicated at 56 in FIG. 1.

Table I describes the flat and conical air bearings used in the rotating vacuum seal assembly and give typical operating conditions. The load capacity refers to the external force which would produce contact between the bearing surfaces. The actual axial load is the sum of the forces exerted by the atmosphere and the force exerted by the compressed air on the conical surface of the rotor. The minimum air pressure which would keep the flat bearing surface separated under static conditions is 4 atmospheres.

TABLE I

|  | Flat Bearing | Conical Bearing |
| --- | --- | --- |
| Bearing Area, Axial Component (cm$^2$) | 87 | 72 |

TABLE I-continued

|  | Flat Bearing | Conical Bearing |
|---|---|---|
| Bearing Area, Radial Component (cm$^2$) | 0 | 140 |
| Air Flow (liters/sec) | <0.5 | 1.2 |
| Air Pressure (atoms) | 5.6 | 4.2 |
| Load Capacity (kg) Axial | 300 | 200 |
| Load Capacity (kg) Radial | 0 | 100 |
| Actual Load (kg) Axial | 200 | 100 |

Rotor 11 is driven by an air jet which hits the blades, not shown, of drive turbine 19, the blades, for example, being 8 mm deep. When the rotor turns rapidly, imbalances tend to produce vibrations. In order to reduce the forces caused by such vibrations, the stator 10 is not mounted rigidly, but is mounted in a gimble ring which permits some motion of the stator.

In a test, the above-described vacuum seal assembly has operated at 5000 rpm for several thousand hours trouble free with a force vacuum on the inside of the seal. There was no noticeable wear on the bearing surfaces. Since the expected lifetime of the target 17 is about 100 hours, and since the target may contain a large amount of radioactive material so that it is undesirable to handle it, it is essential that the vacuum seal does not require servicing in several hundred hours of operation.

It has thus been shown that the present invention provides a rotating air bearing vacuum seal assembly capable of rotation at 5000 rpm and having a leak rate of less than $1 \times 10^{-4}$ Pa m$^3$/s. In addition, the vacuum seal of this invention is particularly applicable for use with rotating targets bombarded by high-power charged-particle beams in vacuum, and has a clear inner diameter of 7.5 cm and can effectively rotate targets in the 21–50 cm diameter range at high speed and increased beam power, thereby substantially advancing the state of the rotating target art.

While a particular embodiment of the invention along with exemplary parameters and materials therefor has been illustrated and/or described, modifications and changes will become apparent to those skilled in the art, and it is intended to cover in the appended claims all such modifications and changes as come within the spirit and scope of the invention.

What I claim is:

1. A rotating vacuum seal assembly comprising a stator, a rotor, and means for rotatably mounting said rotor adjacent said stator, said mounting means being constructed so as to provide a gap between said rotor and said stator and a gap between said rotor and said mounting means, each of said stator and said rotor having a centrally located opening therein adapted to be connected to vacuum, means for directing air under pressure through said gap between said rotor and said stator and between said rotor and said mounting means forming an air cushion therebetween, and means for producing differential pumping for maintaining a pressure gradient between said air cushion and said centrally located openings of said stator and said rotor for producing a leak rate of less than $1 \times 10^{-4}$ Pa m$^3$/s.

2. The rotating vacuum seal assembly defined in claim 1, wherein said rotor has a flat surface facing said stator and a conical surface facing said mounting means.

3. The rotating vacuum seal assembly defined in claim 2, wherein said mounting means comprises a cone bearing ring having an inner surface thereof facing said conical surface of said rotor, and a cone bearing ring support for securing said cone bearing ring about said rotor.

4. The rotating vacuum seal assembly defined in claim 1, wherein said air directing means includes a plurality of openings in said stator connected to an air inlet passage in said stator for directing air under pressure through said gap between said rotor and said stator, and includes a plurality of openings in said mounting means connected to a plurality of air inlet passages in said mounting means for directing air under pressure through said gap between said rotor and said mounting means.

5. The rotating vacuum seal assembly defined in claim 1, wherein said means for producing differential pumping includes a plurality of spaced grooves in said stator adjacent said rotor connected to a vacuum system, each of said spaced grooves being under different vacuum conditions.

6. The rotating vacuum seal assembly defined in claim 5, wherein said plurality of radially spaced grooves consists of two grooves, and wherein said means for directing air under pressure through said gap between said rotor and said stator includes a groove spaced radially outward from said two grooves and connected via a passageway through said stator to atmosphere thus forming an air exhaust.

7. The rotating vacuum seal assembly defined in claim 6, wherein said means for directing air under pressure through said gas between said rotor and said stator additionally includes a second air exhaust comprising a passageway in said mounting means adjacent said stator, and an air inlet means in said stator and located intermediate said air exhausts.

8. The rotating vacuum seal assembly defined in claim 7, wherein said means for directing air under pressure through said gap between said rotor and said mounting means comprises a plurality of openings in said mounting means connected to a plurality of air inlet passages extending through said mounting means, and a pair of air exhaust means, one of said air exhaust means consisting of said second air exhaust, another of said air exhaust means defined by an end of said gap between said rotor and said mounting means opposite said second air exhaust.

9. The rotating vacuum seal assembly defined in claim 8, wherein said rotor is provided with a flat surface adjacent said stator and a conical surface adjacent said mounting means, and wherein said mounting means includes a cone bearing ring positioned about and spaced from said rotator, and a cone bearing ring support positioned around said cone bearing ring and secured to said stator.

10. The rotating vacuum seal assembly defined in claim 9, wherein a plurality of O-rings are located intermediate said cone bearing ring and said cone bearing ring support.

11. The rotating vacuum seal assembly defined in claim 1, wherein said stator is provided with drag pump grooving on one surface thereof.

* * * * *